US007424773B2

(12) United States Patent
Obayashi et al.

(10) Patent No.: US 7,424,773 B2

(45) Date of Patent: Sep. 16, 2008

(54) EYEGLASS LENS PROCESSING APPARATUS

(75) Inventors: Hirokatsu Obayashi, Hoi-gun (JP); Motoshi Tanaka, Gamagori (JP)

(73) Assignee: Nidek Co., Ltd., Aichi (JP)

( * ) Notice: Subject to any disclaimer, the term of this patent is extended or adjusted under 35 U.S.C. 154(b) by 39 days.

(21) Appl. No.: 10/574,198

(22) PCT Filed: Aug. 31, 2005

(86) PCT No.: PCT/JP2005/015936

§ 371 (c)(1),
(2), (4) Date: Mar. 31, 2006

(87) PCT Pub. No.: WO2006/025463

PCT Pub. Date: Mar. 9, 2006

(65) Prior Publication Data

US 2007/0058128 A1 Mar. 15, 2007

(30) Foreign Application Priority Data

Aug. 31, 2004 (JP) ............................ 2004-253395

(51) Int. Cl.
*B23P 13/00* (2006.01)

(52) U.S. Cl. .......................... 29/26 A; 29/558; 409/84; 409/201; 409/235; 451/5; 451/42

(58) Field of Classification Search ................ 29/26 A, 29/27 C, 558, 560, 527.3, 702; 409/235, 409/165, 80, 84, 201, 202; 408/124, 97; 451/5, 8, 11, 41, 42, 44, 255, 265
See application file for complete search history.

(56) References Cited

U.S. PATENT DOCUMENTS 3,584,522 A * 6/1971 Smafield ..................... 408/16
4,642,617 A * 2/1987 Thomas et al. .............. 340/680
4,989,316 A * 2/1991 Logan et al. ............... 29/527.3
5,716,256 A 2/1998 Mizuno et al.
6,481,095 B1 * 11/2002 Mizuno ....................... 29/702
6,561,738 B1 * 5/2003 Fujita et al. ................... 408/97
6,623,339 B1 * 9/2003 Igarashi et al. ................ 451/42
6,641,460 B2 * 11/2003 Obayashi ....................... 451/5
6,702,653 B2 * 3/2004 Shibata ........................ 451/42
6,790,124 B2 9/2004 Shibata
6,913,510 B2 7/2005 Mizuno et al.
7,111,372 B2 * 9/2006 Feldman et al. ............ 29/26 A (Continued)

FOREIGN PATENT DOCUMENTS

JP 9-85585 A 3/1997

(Continued)

OTHER PUBLICATIONS

JP2004-009201 Internet Translation, Publication date Jan. 15, 2004.*

(Continued)

*Primary Examiner*—Dana Ross
(74) *Attorney, Agent, or Firm*—Sughrue Mion, PLLC

(57) ABSTRACT

An eyeglass lens processing apparatus includes: a hole forming portion that includes a hole forming tool which forms a hole for attaching a rimless frame in an eyeglass lens; and breakage detector that detects whether or not the hole forming tool is broken.

4 Claims, 10 Drawing Sheets

U.S. PATENT DOCUMENTS

| | | | | |
|---|---|---|---|---|
| 2001/0053659 | A1 * | 12/2001 | Shibata | 451/42 |
| 2002/0072299 | A1 * | 6/2002 | Obayashi | 451/5 |
| 2003/0097741 | A1 * | 5/2003 | Feldman et al. | 29/26 A |
| 2004/0192170 | A1 * | 9/2004 | Mizun | 451/5 |
| 2005/0020186 | A1 * | 1/2005 | Schneider et al. | 451/41 |

FOREIGN PATENT DOCUMENTS

| | | | |
|---|---|---|---|
| JP | 2000-343310 | A | 12/2000 |
| JP | 2004-9201 | A | 1/2004 |
| JP | 2004-130407 | A | 4/2004 |

OTHER PUBLICATIONS

JP2000343310A Mori Seiki Co., Ltd Dec. 12, 2000 Abstract.*
JP9085585A Nissin Kogyo Co., Ltd Mar. 31, 1997 Abstract.*

* cited by examiner

EYEGLASS LENS PROCESSING APPARATUS

TECHNICAL FIELD

The present invention relates to an eyeglass lens processing apparatus which forms a hole for attaching a rimless frame in an eyeglass lens.

BACKGROUND ART

A process of forming a hole for attaching a rimless frame, such as a so-called two point frame in an eyeglass lens, has been carried out manually by means of a drilling machine and the like. In recent years, however, an eyeglass lens processing apparatus which carries out the process automatically has been proposed (refer to U.S. Pat. No. 6,790,124 (JP-A-2003-145328)).

DISCLOSURE OF THE INVENTION

Problems that the Invention is to Solve

In the processing apparatus, in view of the inner diameter of the hole to be formed in the eyeglass lens a hole forming tool such as, a fine drill, end mill, having a diameter in the order of 1 mm, is used. As a result, in a case in which a large quantity of lenses is consecutively processed at a processing center and the like, it can happen that the hole forming tool breaks partway through the consecutive processing. In the event that processing is continued without this being noticed, a large number of defectively processed lenses occur.

In view of the problem related to the related art, a technical problem which the invention is to solve is to provide an eyeglass lens processing apparatus which is capable of suppressing the occurrence of a defectively processed lens due to a breakage of a hole forming tool.

Means for Solving the Problem

In order to solve the aforementioned problem, the invention is characterized by including the following configuration.

(1) An eyeglass lens processing apparatus comprising:

a hole forming portion that includes a hole forming tool which forms a hole for attaching a rimless frame in an eyeglass lens; and a breakage detector that detects whether or not the hole forming tool is broken.

(2) The eyeglass lens processing apparatus according to (1), wherein the breakage detector includes:

a contact;

a sensor that detects movement of the contact; and a movement mechanism portion that moves the hole forming tool relatively to the contact so that the contact and a tip of the hole forming tool come into contact.

(3) The eyeglass lens processing apparatus according to (2) wherein the sensor is disposed outside a processing chamber in which the hole forming tool is disposed.

(4) The eyeglass lens processing apparatus according to (1) wherein the breakage detector includes a sensor that detects whether or not a tip of the hole forming tool exists via non-contact.

(5) The eyeglass lens processing apparatus according to (4) wherein the sensor is disposed outside a processing chamber in which the hole forming tool is disposed.

(6) The eyeglass lens processing apparatus according to (1) further comprising:

a periphery processing portion that includes a periphery processing tool which grinds or cuts a periphery of the lens; and a controller that operates in order the periphery processing portion and the hole forming portion with respect to the lens, operates the breakage detector before or after every forming of the hole, and, in the event that breakage of the hole forming tool is detected, prohibits subsequent operation of the periphery processing portion and the hole forming portion.

(7) An eyeglass lens processing apparatus according to (6), further comprising a lens conveying portion that conveys the lens between the periphery processing portion and the hole forming portion, wherein when breakage of the hole forming tool is detected, the controller prohibits the subsequent operation of the lens conveying portion.

(8) An eyeglass lens processing apparatus according to (6), further comprising an alarm, wherein when the breakage of the hole forming tool is detected, the controller causes the alarm to issue warning to that effect.

ADVANTAGE OF THE INVENTION

According to the invention, it is possible to suppress the occurrence of a defectively processed lens due to a breakage of a hole forming tool.

BEST MODE FOR CARRYING OUT THE INVENTION

Figure 1:
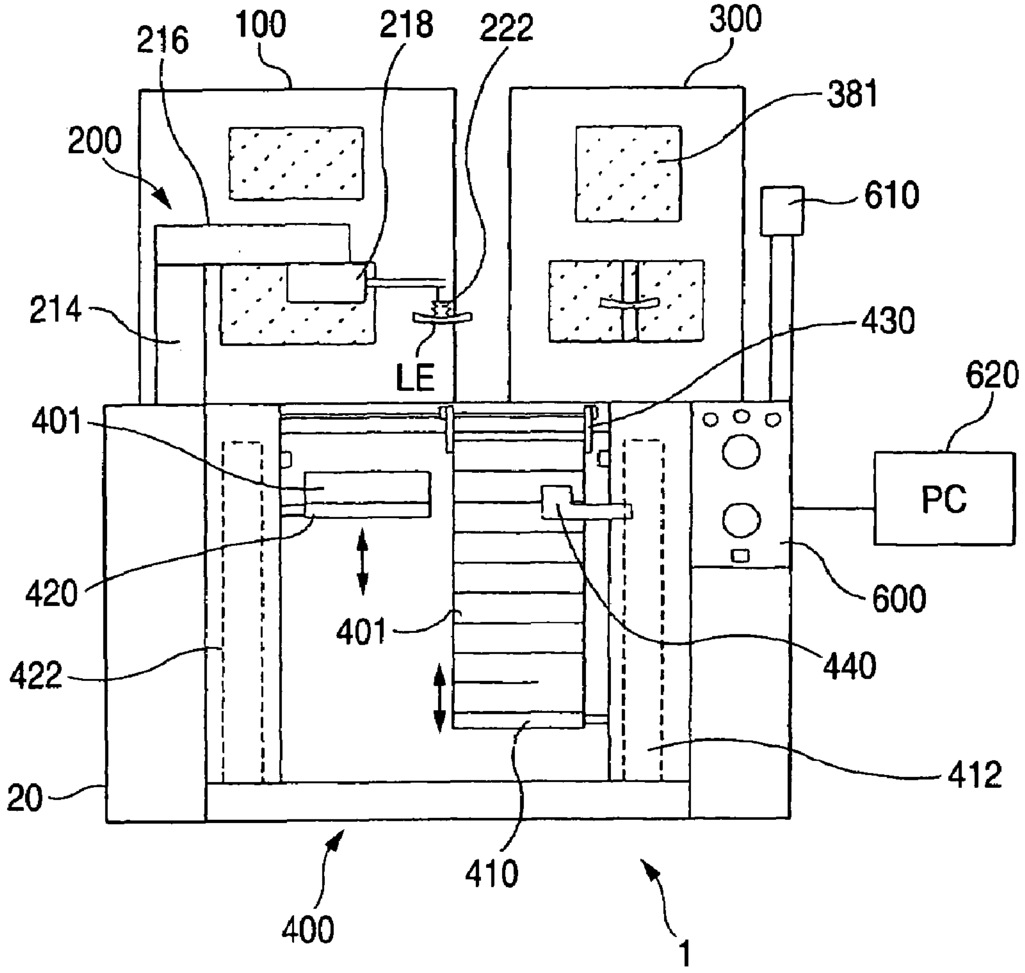
FIG. 1 is a schematic configuration diagram of an eyeglass lens processing system which is an embodiment of the invention.

An embodiment of the invention will hereafter be described with reference to the drawings. FIG. 1 is a schematic configuration diagram of an eyeglass lens processing system which is an embodiment of the invention.

An eyeglass lens processing system 1 includes: a periphery processing apparatus 100 for grinding or cutting (grinds in the case of the embodiment) the periphery of an eyeglass lens LE; a lens conveying apparatus 200 (robot hand apparatus) for conveying the lens LE; a hole forming apparatus 300 for forming a hole in the lens LE; a lens stocking apparatus 400 for stocking a plurality of lens storage trays 401, in which the lenses LE for both the right and left eye are stored as a pair; and a system controller 600 for controlling each apparatus. The system controller 600 is connected to a host computer (host PC) 620 for managing an ordering data. A warning lamp 610, which is connected to the system controller 600, gives a warning in the event of an abnormality in each apparatus, such as a breakage in a hole forming tool.

The stocking apparatus 400 includes: a transfer stage 410 and a receiving stage 420, onto which the trays 401 are loaded in series in a vertical direction (z direction); a movement mechanism part 412 for moving the stage 410 in the vertical direction; a movement mechanism portion 422 for moving the stage 420 in the vertical direction; a clamp arm 430 for clamping the tray 401 and moving it from the stage 410 to the stage 420; and a barcode reader 440 for reading a barcode of a work No. assigned to the tray 401. 10 trays 401 can be loaded onto each stage 410 and 420, and 10 pairs of the lens LE can be processed consecutively.

The periphery processing apparatus 100 and the hole forming apparatus 300 are installed on a table 20 of the system 1. The conveying apparatus 200 is installed so as to be movable in a left-right direction (X direction) along a conveying path provided between the periphery processing apparatus 100 and hole forming apparatus 300 and the stocking apparatus 400. The conveying apparatus 200 is provided with a vertical slide 214 so as to be movable in the vertical direction, the vertical slide 214 is provided with a first arm 216 so as to be rotatable in a horizontal direction, and the first arm 216 is provided with a second arm 218 so as to be rotatable in the horizontal direction. A tip of the second arm 218 is provided with a sucking member 222 that sucks and holds the lens LE. The sucking member 222 is connected to an air pump, whereby it sucks and holds the lens LE by means of the air pump drive. The conveying apparatus 200 takes out an unprocessed lens LE from the tray 401, conveys it in turn to the periphery processing apparatus 100 and the hole forming apparatus 300, then returns the processed lens LE to the same (original) tray 401.

Figure 2:
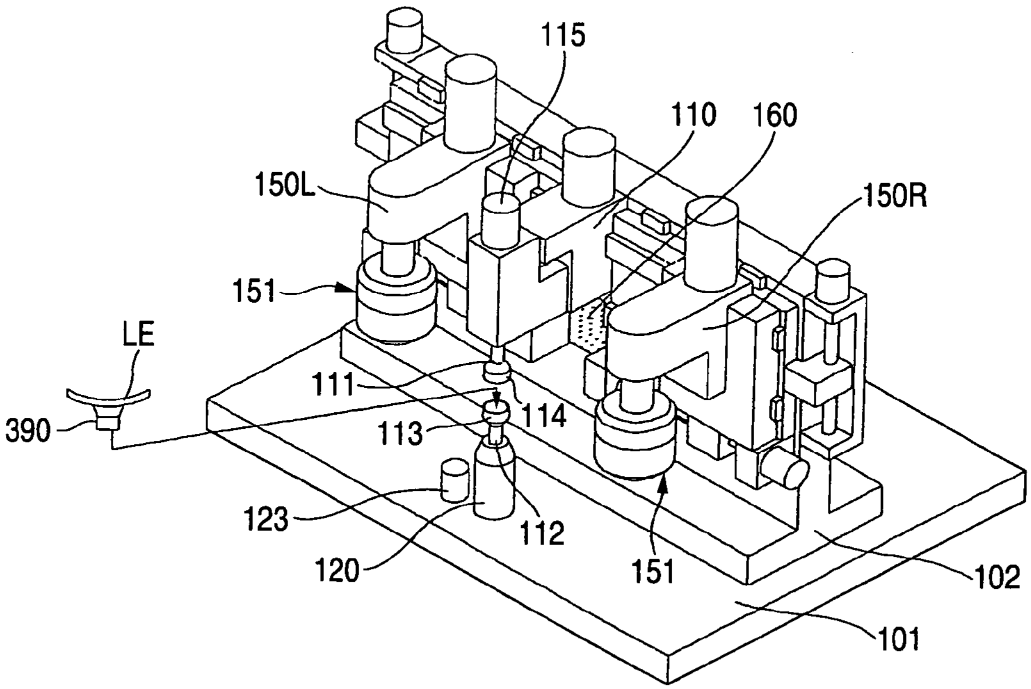
FIG. 2 is a schematic configuration view of a periphery processing apparatus.

FIG. 2 is a schematic configuration view of the periphery processing apparatus 100. The lens LE is clamped by chuck shafts 111 and 112 which extend in the vertical direction. The upper side chuck shaft 111 is moved in the vertical direction by a movement mechanism portion 110 provided in the center of a sub-base 102, and is rotated by a motor 115. The lower side chuck shaft 112 is rotatably held by a holder 120, which is fixed to a main base 101, and is rotated in synchronization with the chuck shaft 111 by a motor 123.

To clamp the lens LE by the chuck shafts 111 and 112, a cup 390 as a processing jig is attached to the lens LE by an adhesive pad. A cup holder 113 is attached to an upper tip of the chuck shaft 112 for the purpose of inserting a base of the cup 390. A lens retainer 114 is attached to a lower tip of the chuck shaft 111.

The lens LE which is clamped by the chuck shafts 111 and 112 is grinded from two directions by periphery processing portions 150R and 150L having rotating shafts to which grindstones 151 are attached respectively. The grindstone 151 includes a grindstone for roughing, a grindstone for plane-finish, a grindstone for bevel-finishing, and a grindstone for chamfering. The periphery processing portions 150R and 150L are bilaterally symmetrical, and are respectively moved in the vertical direction and the right-left direction by the movement mechanism portion provided on the sub-base 102. A lens shape measuring portion 160 is contained in a central rear side of the sub-base 102. The configuration of the periphery processing apparatus 100 is basically the same as one in U.S. Pat. No. 5,716,256 (JP-A-9-253999).

Figure 3:
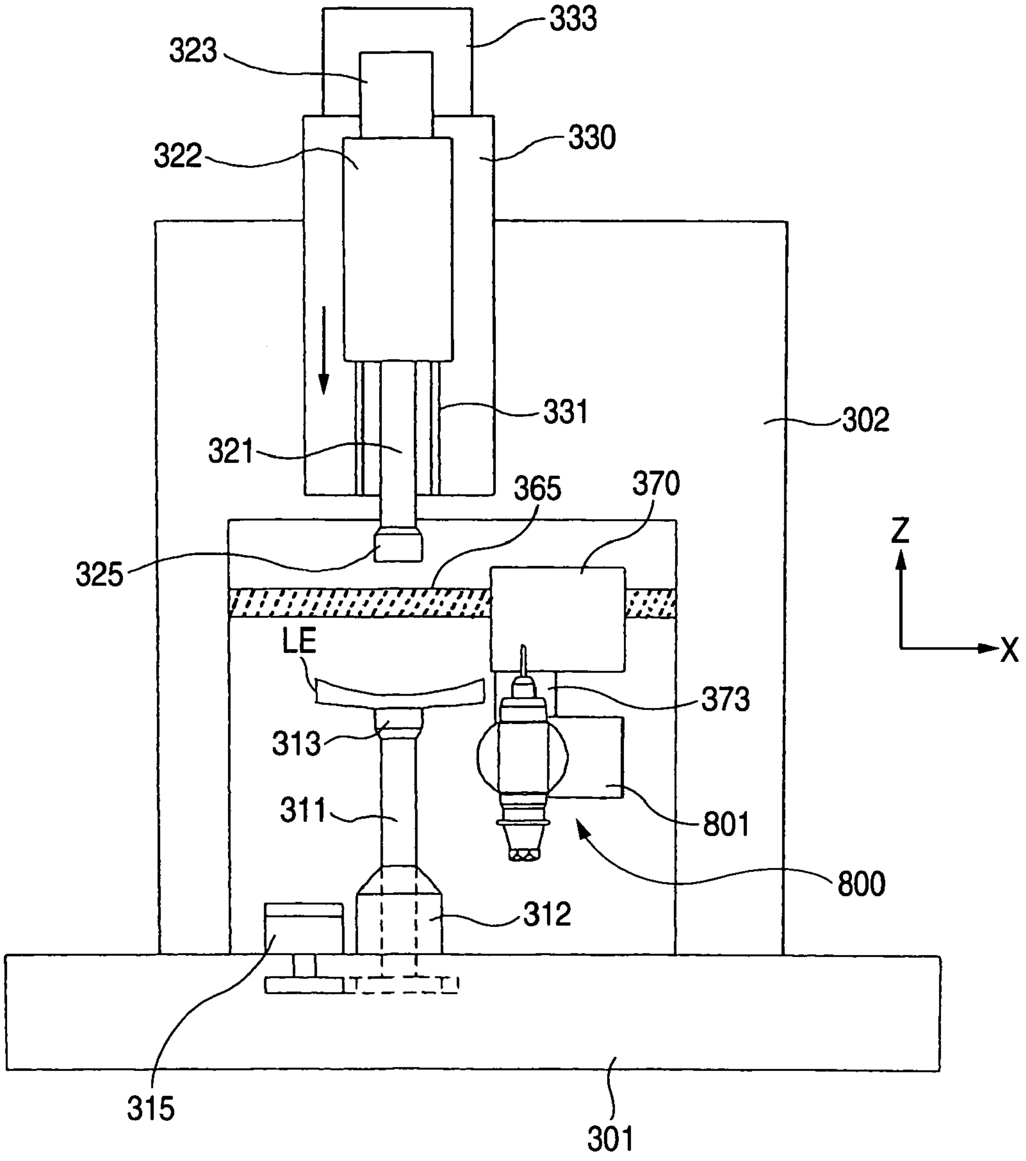
FIG. 3 is a schematic configuration diagram of a lens holding mechanism of a hole forming apparatus.

Next, a description of a configuration of the hole forming apparatus 300 will be given with reference to FIGS. 3 to 7. FIG. 3 is a schematic configuration diagram of a lens holding mechanism of the hole forming apparatus 300, in which the inside of the apparatus 300 is viewed from the front. The lens LE is clamped by chuck shafts 311 and 321 which extend in the vertical direction. The upper side chuck shaft 321 is rotatably held by a holder 322, and is rotated by a motor 323 provided on the top of the holder 322. A block 330 is fixed to the upper part of a sub-base 302, which stands on a main base 301, and the holder 322 is attached to the front side of the block 330 so as to be movable in the vertical direction along a slide rail 331. The holder 322 is moved in the vertical direction by a motor 333 provided on the top of the block 330. With this arrangement, the chuck shaft 321 is moved in the vertical direction. The lower side chuck shaft 311 is rotatably held by a holder 312 fixed to the main base 301, and is rotated in synchronization with the chuck shaft 321 by a motor 315.

A cup holder 313 is attached to an upper tip of the chuck shaft 311 for the purpose of inserting the base of the cup 390 fixed to the lens LE. A lens retainer 325 is attached to a lower tip of the chuck shaft 321.

Figure 4:
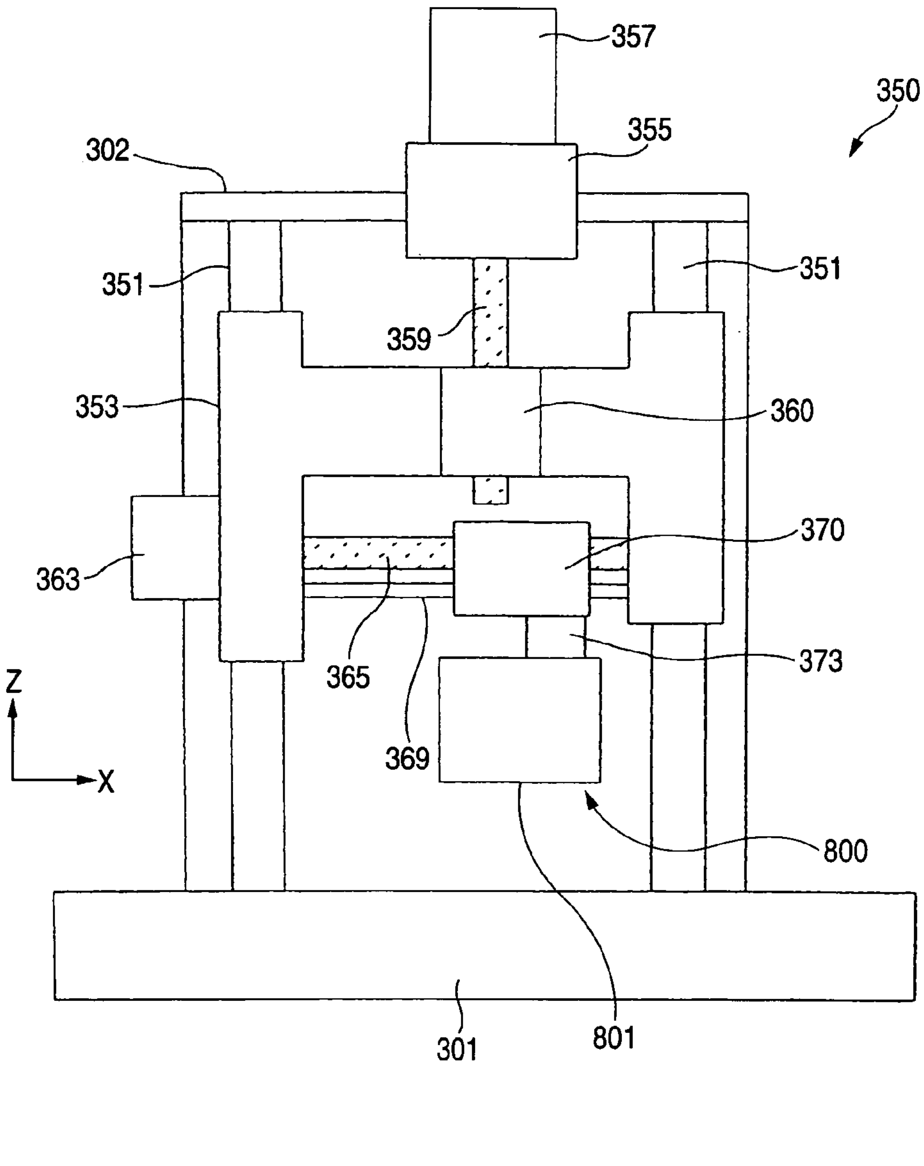
FIG. 4 is a schematic configuration diagram of a vertical and left-right movement mechanism of the hole forming apparatus.

A hole forming portion 800 is moved in the vertical direction and the left-right direction by a movement mechanism portion 350. FIG. 4 is a schematic configuration diagram of a vertical and left-right movement mechanism of the hole forming apparatus 300, in which the inside of the apparatus 300 is viewed from the rear. Two shafts 351 which extend in the vertical direction are stood on the main base 301, and a movement support base 353 is provided in such a way as to be movable in the vertical direction along shafts 351. A block 355 is fixed to the upper part of the sub-base 302, and a feed screw 359 extending in the vertical direction is coupled to a rotating shaft of a motor 357 provided on the top of the block 355. A nut block 360 is fixed to the rear of the movement support base 353, and the movement support base 353 is moved in the vertical direction, in conjunction with the nut block 360, by the rotation of the feed screw 359.

A feed screw 365 extending in the left-right direction is coupled to a rotating shaft of a motor 363 fixed to the movement support base 353. When the feed screw 365 rotates, a movement block 370 formed with a feed nut is moved in the left-right direction, and is guided by a shaft 369 extending in the left-right direction. The hole forming portion 800 is attached to the movement block 370 via an attachment plate 373. As a result, the hole forming portion 800 is moved in the vertical direction by a forward/reverse rotation of the motor 357, and moved in the left-right direction by a forward/reverse rotation of the motor 363.

Figure 5:
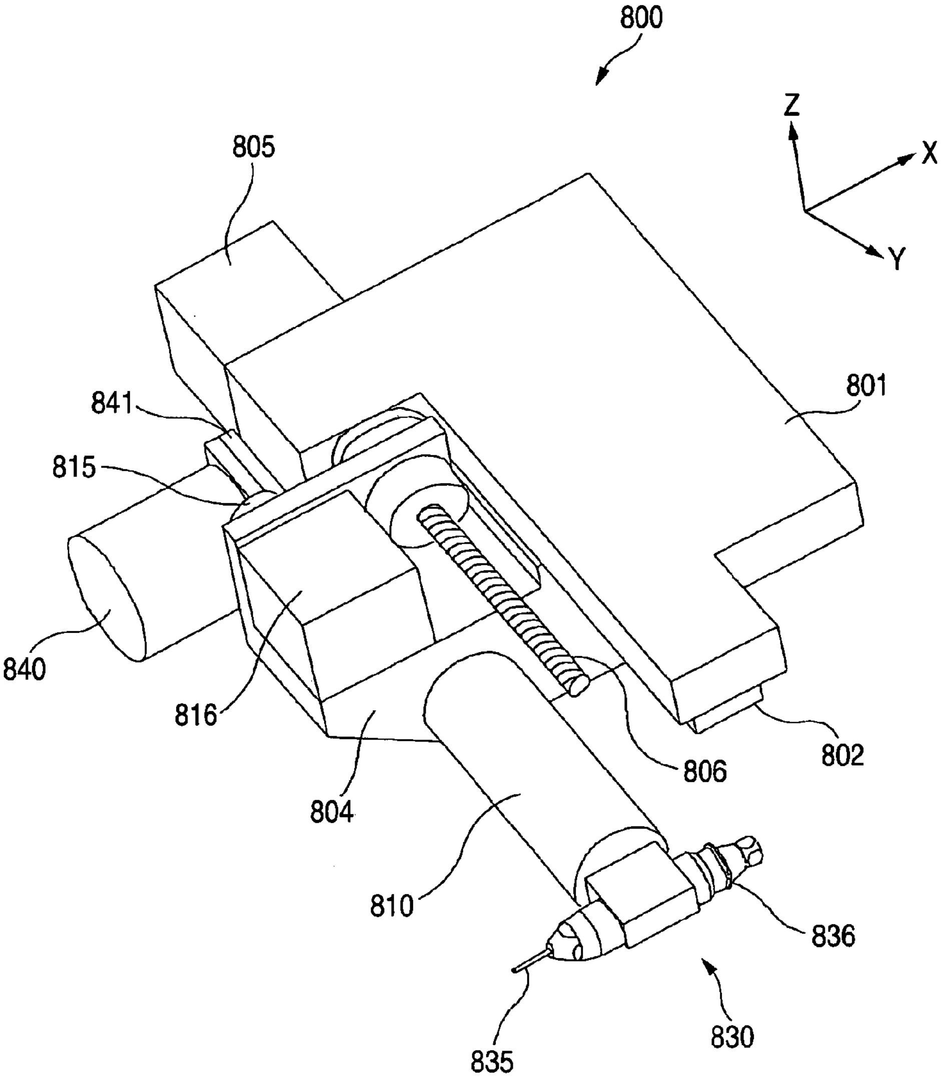
FIG. 5 is an external view showing a schematic configuration of a hole forming portion.
Figure 6:
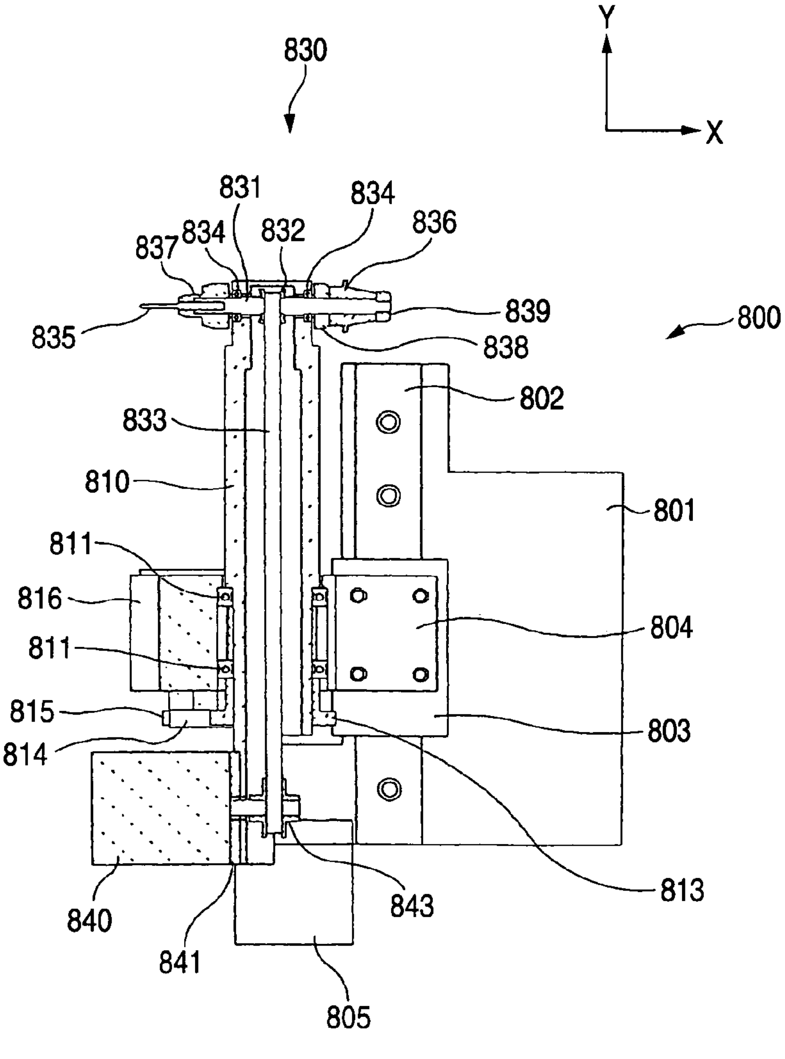
FIG. 6 is a sectional view showing a schematic configuration of the hole forming portion.

FIG. 5 is an external view showing a schematic configuration of the hole forming portion 800, and FIG. 6 is a sectional view showing a schematic configuration of the hole forming portion 800.

A fixing plate 801 as a base of the hole forming portion 800 is fixed to the attachment plate 373 of the movement mechanism portion 350. A rail 802 extending in a forward-back direction (Y direction) is attached to the fixing plate 801, and a slider 803 is provided so as to be slidable along the rail 802. A movement support base 804 is fixed to the slider 803, and the movement support base 804 is moved in the forward-back direction by rotating a ball screw 806 by a motor 805 fixed to the fixing plate 801.

A rotation support base 810 is rotatably pivoted to the movement support base 804 by means of a bearing 811. A gear 813 is fixed to the rotation support base 810 on one side of the bearing 811. The gear 813 is connected, via an idle gear 814, to a gear 815 attached to a rotating shaft of a motor 816 which is fixed to the movement support base 804. That is, the rotation support base 810 is rotated around an axis of the bearing 811 by means of the motor 816.

A rotation portion 830 for holding a tool for forming a hole and grooving is provided on the tip of the rotation support base 810. The rotation portion 830 is moved in the forward-back direction by the motor 805. A pulley 832 is attached to a central part of a rotating shaft 831 of the rotation portion 830, and the rotating shaft 831 is rotatably pivoted by two bearings 834. A drill 835, which acts as a hole forming tool, is attached to one end of the rotating shaft 831 by a chuck 837, while a spacer 838 and a grooving grindstone 836 are attached to the other end by a nut 839. A diameter of the drill 835 is in the order of 0.8 mm.

A motor 840 for rotating the rotating shaft 831 is fixed to an attachment plate 841 attached to the rotation support base 810. A pulley 843 is attached to a rotating shaft of the motor 840. A belt 833 is wound around the pulley 832 and the pulley 843 inside the rotation support base 810, and the rotation of the motor 840 is transmitted to the rotating shaft 831.

Figure 7:
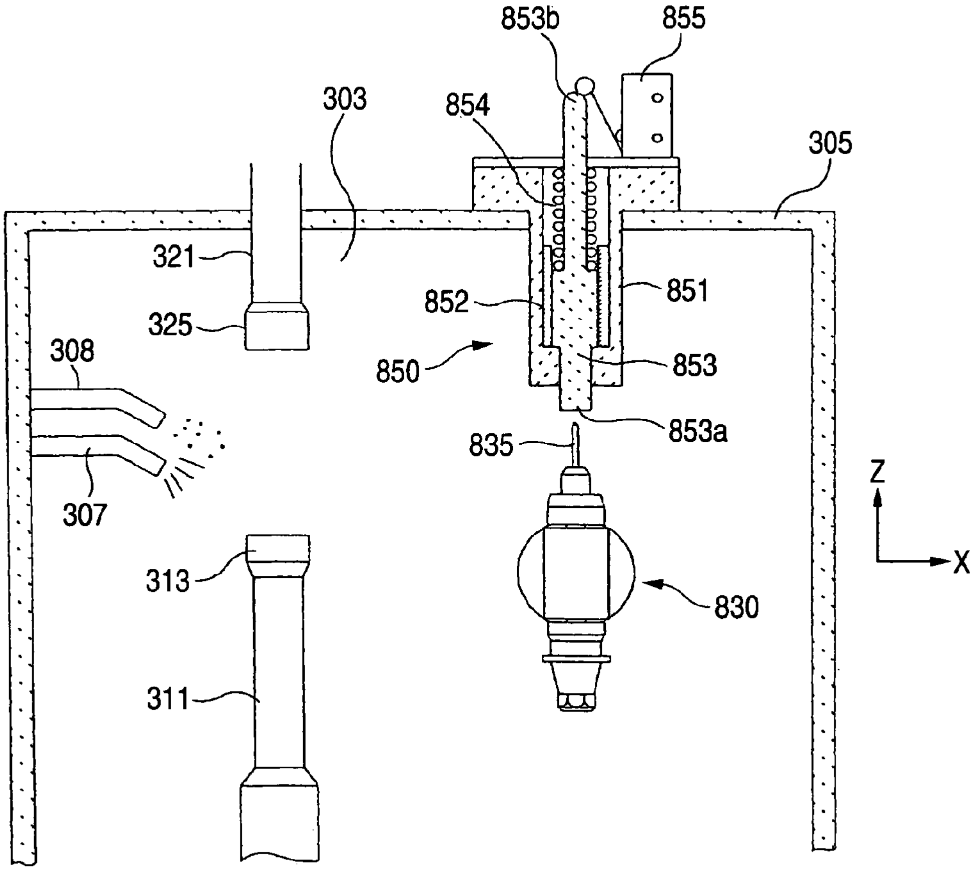
FIG. 7 is a schematic configuration diagram of a drill breakage detector.

FIG. 7 is a schematic configuration diagram of a drill breakage detector 850. A shaft 853 is held, via a sliding bearing 852, by a support base 851 of the drill breakage detector 850, in such a way as to be movable in the vertical direction. A bottom surface 853*a* of the shaft 853 projects beyond the support base 851, thereby forming a contact with which the drill 835 is contacted. The shaft 853 is constantly urged in a downward direction by a spring 854. A micro switch 855 provided on the top of the support base 851 is disposed in such a way as to be switched on (energized) by a top end 853*b* of the shaft 853 being pushed by a certain amount in an upward direction. That is, in a case in which the drill 835 is not broken, when the rotation portion 830 disposed in a prescribed initial position is moved by a certain amount in the upward direction, a tip of the drill 835 comes into contact with the bottom surface 853*a* of the shaft 853, thereby pushing up the shaft 853. A length of the drill 835 is known, and when the shaft 853 is moved by a certain amount in the upward direction, the micro switch 855 comes on. By this means it can be detected that the drill 835 is not broken. It is acceptable to use a photodetector such as a light extinction sensor, in place of the micro switch 855, as a detector which detects the movement of the shaft 853.

The support base 851 is provided on top of a partition 305 which forms a processing chamber 303 of the hole forming apparatus 300. Although the bottom surface 853*a* of the shaft 853 is inside the processing chamber 303, the top end 853*b* of the shaft 853 and the micro switch 855, which acts as an electrical element, are disposed outside the processing chamber 303. Inside the processing chamber 303, when forming a hole in the lens LE, air supplied by a not-shown air pump is blown out of a nozzle 307, whereby shavings (processing waste) adhering to the lens LE are blown away. When forming a groove in the lens LE, water is sprayed from a nozzle 308. As a result, shavings and water fly around inside the processing chamber 303. As it is necessary to protect the micro switch 855, which is the electrical element, from the shavings and water, it is disposed outside the processing chamber 303.

Figure 8:
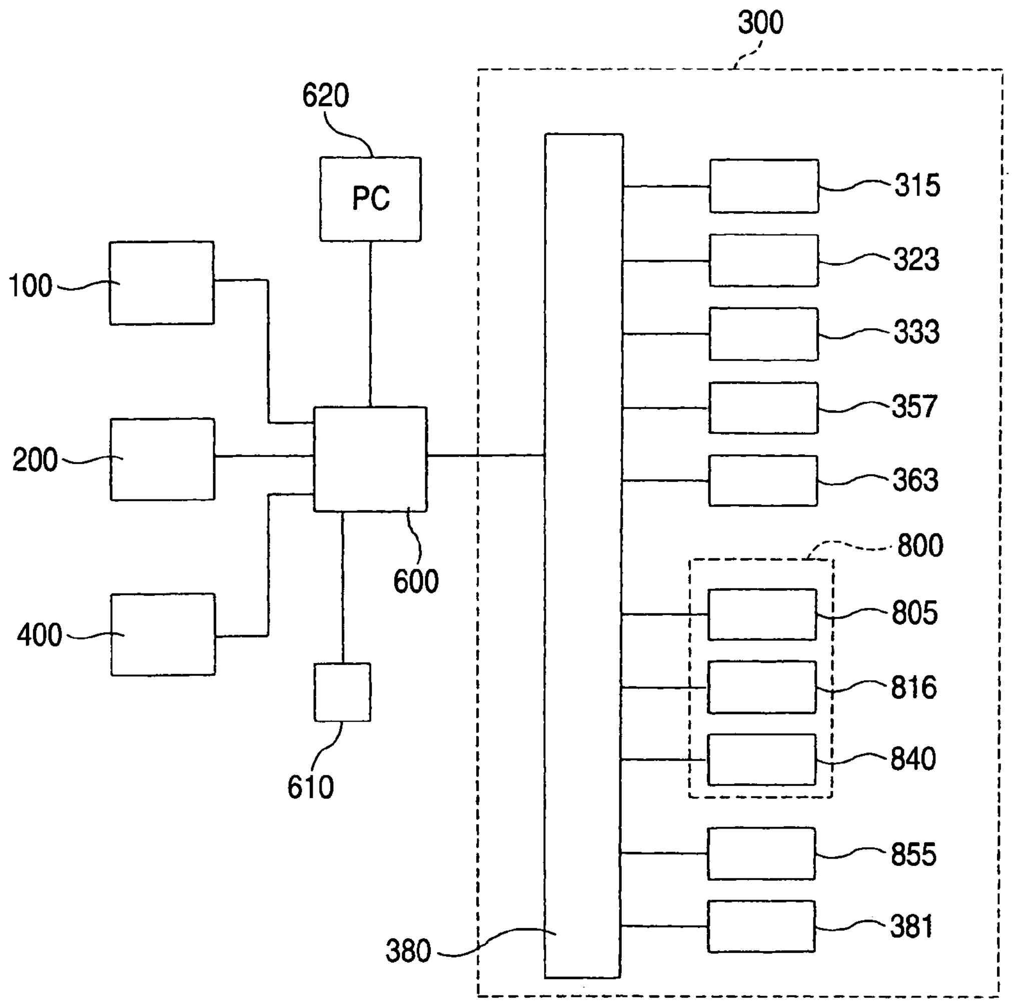
FIG. 8 is a schematic block diagram of a control system of the eyeglass lens processing system.

Next, an operation of the eyeglass lens processing system which has this kind of configuration will be described, using a schematic block diagram of a control system in FIG. 8. As a preparation for processing, an operator stores one pair of unprocessed lenses LE in the tray 401, and loads ten trays 401 onto the stage 410 of the stocking apparatus 400 in series in the vertical direction. The cup 390 is fixed in advance to the lens LE which is stored in the tray 401. The operator starts the processing system by pressing a processing switch of the system controller 600.

First, the stocking apparatus 400 starts operating and the bar code reader 440 reads the work No. assigned to the tray 401 which is on the top level. The system controller 600 reads a target lens shape data, hole position data, hole direction data and the like, which corresponds to the work No., from the host PC 620, then sends the data necessary for the respective process to the periphery processing apparatus 100 and the hole forming apparatus 300. When the tray 401 on the top level is positioned in a prescribed delivery position, the conveying apparatus 200 sucks and holds the lens LED via the sucking member 222, and conveys it to the periphery processing apparatus 100. In the periphery processing apparatus 100, the lens LE is clamped by the chuck shafts 111 and 112, and a configuration of a front surface and a rear surface of the lens LE is measured by the operation of the lens shape measuring portion 160. When a hole is formed, the lens shape measuring portion 160 measures the hole position (a position in the Z direction) of the front surface of the lens LE in accordance with the hole position data (for example, a radial angle θ and a radial length d in respect to the center of the lens chuck). A measurement result of the hole position is sent to the hole forming apparatus 300.

When the measurement result of the lens LE configuration is obtained, the periphery of the lens LE is grinded by the periphery processing portions 150R and 150L. Then, when the periphery processing is finished, the lens LE is taken out from the periphery processing apparatus 100 by the conveying apparatus 200 and conveyed to the hole forming apparatus 300. In the hole forming apparatus 300, when the lens LE is placed on the chuck shaft 311, the motor 333 is driven by control of the controller 380, and the chuck shaft 321 is moved in the downward direction, thereby clamping the lens LE.

At the time of forming a hole, the controller 380 detects whether drill breakage occurs or not by the drill breakage detector 850 before forming a hole. First, the controller 380 controls the drive of the motors 357 and 363 of the movement mechanism portion 350, the motor 805 of the hole forming portion 800, and the like to place the drill 835 in the initial position below the bottom surface 853*a* of the shaft 853 and then to move the drill 835 by a certain amount in the upward direction by the drive of the motor 357 as shown in FIG. 7. If the tip of the drill 835 comes into contact with the bottom surface 853*a* of the shaft 853 and the micro switch 855 turns on due to the shaft 853 being pushed upwards, it is detected that there is no drill breakage. In a case in which the controller 380 detect that there is no drill breakage based on an output signal from the micro switch 855, the process shifts to the hole forming stage.

Figure 9:
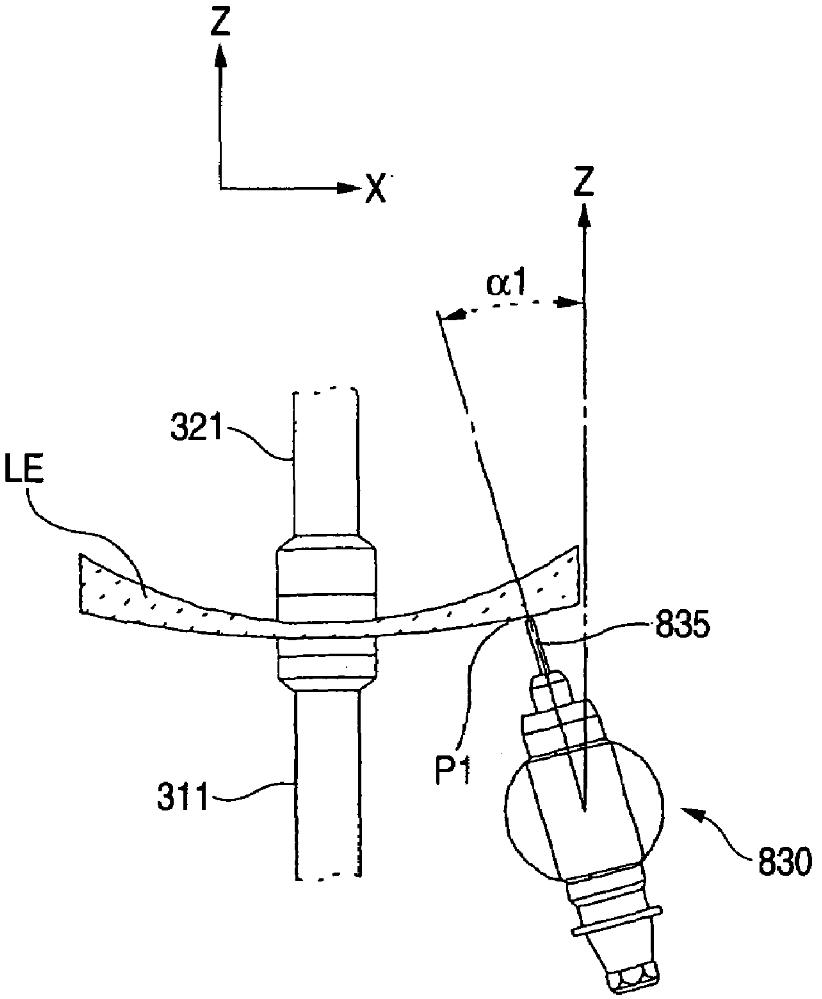
FIG. 9 is a diagram illustrating a forming of a hole in a lens.

A description will be given of the hole forming. The hole forming data is determined by the controller 380 based on the input data (hole position data, hole direction data) from the host PC 620, and the lens LE front surface hole position data (Z direction position) obtained from the lens shape measuring portion 160 of the periphery processing apparatus 100. The controller 380 controls the drive of the motor 315 and the motor 323 to rotate the lens LE which is clamped by the chuck shafts 311 and 321, and controls the drive of the motors 357, 363 and 805 and the like to position the tip of the drill 835 in hole position P1 of the lens LE, as shown in FIG. 9. In a case of having the hole direction data of an angle α1 in the X-Z directions, the controller 380 controls the drive of the motor 816 to tilt the drill 835 by the angle α1. In this condition, by controlling each motor of the movement mechanism portion 350 in such a way that the tip of the drill 835 advances in the direction of the angle $\alpha 1$ while the drill 835 is being rotated, a hole is formed in the lens LE. In a case of having an angle data related to the X-Z directions, the hole forming can be carried out by controlling the rotation angle of the lens LE (refer to U.S. Pat. No. 6,790,124 (JP-A-2003-145328) for details). When forming a hole, air is ejected from the nozzle 307, whereby the shavings adhering to the drill 835 and the hole in the lens LE are blown away.

When the hole forming is finished, the lens LE is taken out from the hole forming apparatus 300 by the conveying apparatus 200, and returned to its original position in the same (original) tray 401. Subsequently, the other lens LE which is in the same tray 401 is conveyed in the same way, and periphery processing is carried out by the periphery processing apparatus 100 and hole forming is carried out by the hole forming apparatus 300. When the processing of the pair of lenses LE stored in the tray 401 is finished, the tray 401 containing the processed lens LE is moved to the stage 420 by the clamp arm 430, and loaded thereon. Subsequently, to process the lens LE contained in the next tray 401, the tray 401 on the second level is moved to the prescribed delivery position, and the lens LE contained in the tray 401 is conveyed to the periphery processing apparatus 100 and the hole forming apparatus 300 by the conveying apparatus 200, and processing is carried out in the same way. In a case in which processing includes grooving processing, the grooving processing is carried out by the grooving grindstone 836 which is included in the hole forming portion 800 of the hole forming apparatus 300.

In this way, a plurality of the lenses LE contained in the tray 401 is processed consecutively. During this time, the operator can carry out operating preparation of another system, as it is not necessary to constantly attend the processing system.

As the drill 835 has a small diameter of 0.8 mm, it tends to break in the course of processing a large quantity of the lenses LE. As the configuration of the drill 835 is such as to have a uniform diameter from the base to the tip, it breaks from the base. To detect whether drill breakage occurs or not by the drill breakage detector 850 every time before forming a hole, the controller 380 moves the drill 835 by a certain amount in the upward direction by the drive of the motor 357 after placing the drill 835 in the initial position below the bottom surface 853*a* of the shaft 853. In a case of drill breakage occurring during the previous processing, since the shaft 853 cannot be pushed upwards even by moving the drill 835 by a certain amount in the upward direction, the micro switch 855 does not turn on. In a case that there is no on signal (energization signal) from the micro switch 855 when the drill 835 is moved in the upward direction, the controller 380 determines that the drill 835 is broken. In a case in which the controller 830 detects that the drill 835 is broken, the subsequent processing is prohibited (stopped) and an error message to that result is displayed on an indicator 381 provided on the front surface of the hole forming apparatus 300. Further, the controller 380 sends to the system controller 600 an error signal to the effect that the drill has broken. The system controller 600 illuminates the warning lamp 610 to warn the operator of a system abnormality, and prohibits (stops) the operation of the periphery processing apparatus 100 and the conveying apparatus 200. The operator can be informed of the drill breakage by the illumination of the warning lamp 610 and the error message of the indicator 381, and is therefore able to replace the drill 835. By this means, it is possible to suppress the occurrence of a large quantity of defectively processed lenses due to drill breakage. It is also acceptable to operate the drill breakage detector 850 after forming the hole rather than before forming the hole.

Various modifications are possible in the embodiment described heretofore. For example, with regard to the drill breakage detector 850 shown in FIG. 7, although the configuration is such that the drill 835 is moved in the upward direction by the movement mechanism portion 350, thereby pushing up the shaft 853, it is also acceptable to relatively reverse the movement. That is, it is also acceptable to provide a mechanism which moves the drill breakage detector 850 to a position in which it comes into contact with the tip of the drill 835, so that the micro switch 855 turns on in the same way when there is no drill breakage.

Figure 10:
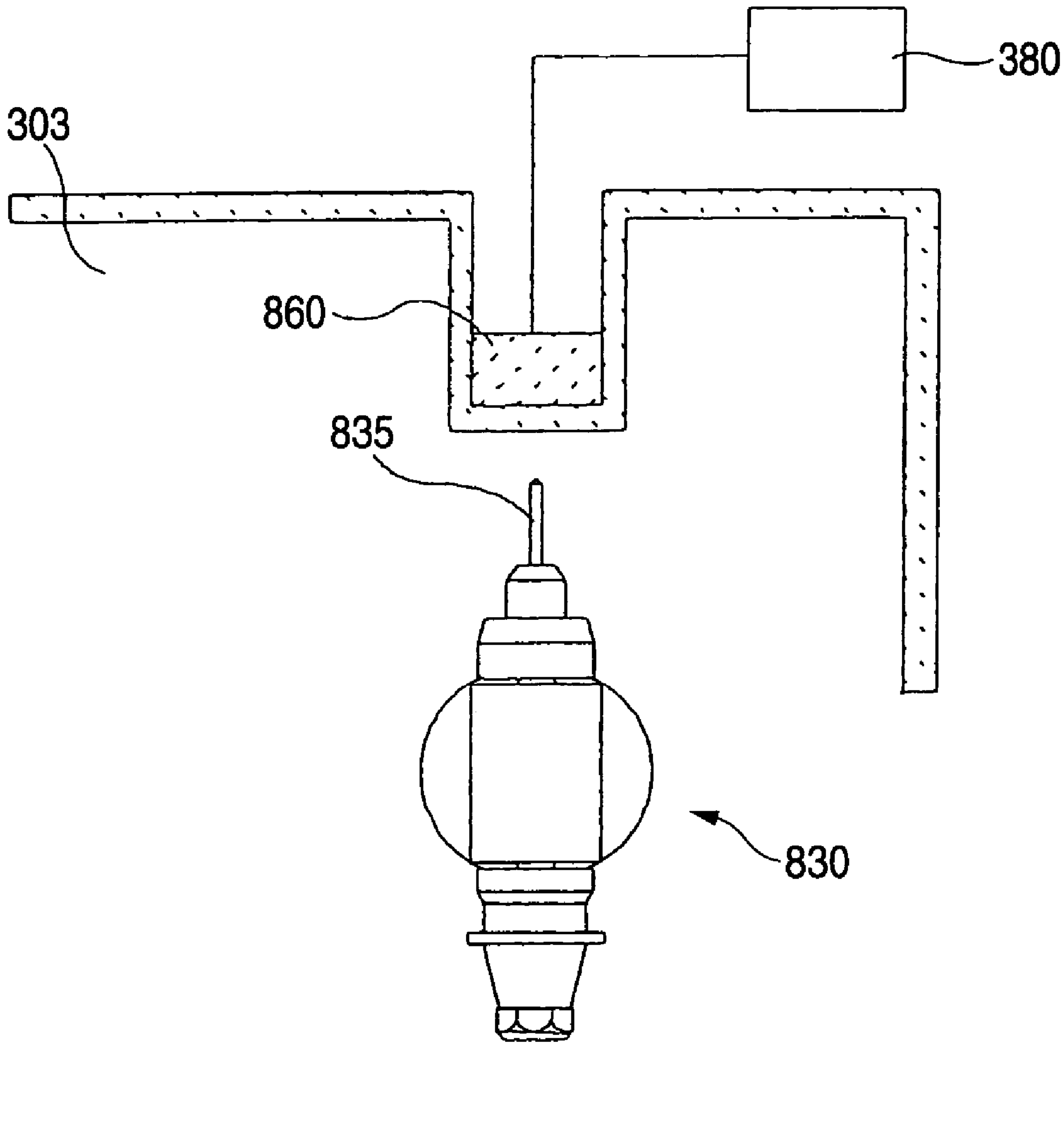
FIG. 10 is a schematic configuration diagram of a modified example of the drill breakage detector.

Furthermore, it is also possible to carry out drill breakage detection by using a detector which detects whether the tip of the drill 835 occurs via non-contact. For example, as shown in FIG. 10, a capacitance sensor 860 is positioned outside the processing chamber 303, and the tip of the drill 835 is brought into proximity with the capacitance sensor 860 when detecting drill breakage. In the event that the drill 835 is broken, the tip does not come into proximity with the capacitance sensor 860, and thus the controller 380 is able to detect whether a drill breakage occurs or not from a difference in an output signal from the capacitance sensor 860.

In the embodiment, the configuration is such that the hole forming portion 800 and the drill breakage detector 850 are provided separately from the periphery processing portions 150R and 150L, but a configuration in which they are all provided in the periphery processing apparatus 100, as in U.S. Pat. No. 6,790,124 (JP-A-2003-145328), is also acceptable. Furthermore, it is also acceptable that the periphery processing portion is one which grinds the lens LE from one direction, rather than from two directions. Further still, it is also acceptable to use a conveyor belt type as a configuration which consecutively feeds the lens LE contained in the tray 401.

The invention claimed is:

1. An eyeglass lens processing apparatus comprising:

a lens holding unit that holds and rotates an eyeglass lens;

a hole forming tool which forms a hole for attaching a rimless frame in a refractive surface of the lens;

a tilt mechanism portion that tilts the hole forming tool relatively to the lens held by the lens holding unit;

a movement mechanism portion that moves the hole forming tool in a rotating axis direction thereof relatively to the lens held by the lens holding unit;

a calculator that calculates hole forming data based on target lens shape data, hole position data and hole direction data of the rimless frame;

a breakage detector that is provided outside a partition forming a lens processing chamber and includes a sensor for detecting movement of a shaft due to an abutment against a tip of the hole forming tool or detecting a proximity state of the tip of the hole forming tool; and a controller that judges whether or not the hole forming tool is broken based on an output of the breakage detector and prohibits the hole forming based on the hole forming data when the hole forming tool is broken.

2. The eyeglass lens processing apparatus according to claim 1, further comprising:

a periphery processing tool which grinds or cuts a periphery of the lens, where the controller in the event that the hole forming tool is broken, prohibits the periphery processing and the hole forming.

3. An eyeglass lens processing apparatus according to claim 2, further comprising a lens conveying portion that conveys the lens between the periphery processing portion and the hole forming portion, wherein when the hole forming tool is broken, the controller prohibits the operation of the lens conveying portion.

4. An eyeglass lens processing apparatus according to claim 2, further comprising an alarm, wherein when the hole forming tool is broken, the controller causes the alarm to issue warning to that effect.

* * * * *